US005228709A

United States Patent [19]

Kao

[11] Patent Number: 5,228,709

[45] Date of Patent: Jul. 20, 1993

[54] WHEELCHAIR DRIVING MECHANISM

[75] Inventor: Fong-Chung Kao, Taipei, Taiwan

[73] Assignee: Kung-Hsiung Wu, Taipei, Taiwan

[21] Appl. No.: 942,806

[22] Filed: Sep. 10, 1992

[51] Int. Cl.[5] .......................... B62M 1/14; B62B 5/02

[52] U.S. Cl. ................................ 280/250.1; 280/244; 280/5.2; 280/5.3

[58] Field of Search ...................... 280/244, 246, 250.1, 280/5.2, 5.3, DIG. 10

[56] References Cited

U.S. PATENT DOCUMENTS

| | | | |
|---|---|---|---|
| 2,701,005 | 2/1955 | Bennett et al. | 280/5.3 |
| 3,573,877 | 4/1971 | Locke | 280/5.2 X |
| 4,455,029 | 6/1984 | Taylor | 280/250.1 X |
| 4,560,181 | 12/1985 | Herron | 280/244 X |
| 4,747,611 | 5/1988 | Daugherty, Jr. | 280/250.1 |

FOREIGN PATENT DOCUMENTS

| | | | |
|---|---|---|---|
| 1530184 | 12/1989 | U.S.S.R. | 280/250.1 |

*Primary Examiner*—Margaret A. Focarino
*Assistant Examiner*—C. Mattix
*Attorney, Agent, or Firm*—Varndell Legal Group

[57] ABSTRACT

A wheelchair driving mechanism includes a driving disk fastened to either large wheel of a wheelchair by a circular table and a circular casing for moving the wheelchair with the hand, and a ratchet wheel mechanism for permitting the respective large wheel to be rotated by the driving disk in one direction only. A hand lever may be fastened to the driving disk for rotating the respective large wheel with less labor. An adjustable foot plate stand may be extended out of the respective hanger bracket to match with the hand lever in supporting the wheelchair for permitting the wheelchair to be rotated over an obstacle.

4 Claims, 6 Drawing Sheets

WHEELCHAIR DRIVING MECHANISM

BACKGROUND OF THE INVENTION

The present invention relates to a wheelchair driving mechanism and relates more particularly to a hand-driven wheelchair driving mechanism for driving a wheelchair by the user.

An invalid person may have to use a supporting device such as a wheelchair or a crutch for moving or walking. A wheelchair is very helpful to those invalid people having problems on their legs. Various wheelchairs are known and designed for the use of invalids. These wheelchairs may be collapsible, lightweight, comfortable in use, or attractive in outer appearance, however, they commonly use a push rim fastened to each large wheel for pushing with the hand. These push rim needs much labor to rotate. Furthermore, these wheelchairs have no supporting means in helping the user passing over steps or obstacles in the way.

SUMMARY OF THE INVENTION

The present invention has been accomplished under the aforesaid circumstances. It is therefore one object of the present invention to provide a wheelchair driving mechanism which can be operated to continuously rotate the large wheels of a wheelchair with less labor. It is another object of the present invention to provide a wheelchair driving mechanism which can be operated by the wheelchair user to move the wheelchair over a step or an obstacle. It is still another object of the present invention to provide a wheelchair driving mechanism which can be used with any existing wheelchair.

According to one aspect of the present invention, a wheelchair driving mechanism is generally comprised of a circular casing fastened to the spokes of either large wheel of a wheelchair by chucks, a circular table connected to the circular casing and controlled to rotate in one direction by a ratchet wheel mechanism, and a driving disk fastened to the circular table for rotating the respective large wheel by the hand, wherein the driving disk has a rim for pushing with the hand, and a plurality of circular recessed for rotating the driving disk with the fingers continuously. According to another aspect of the present invention, a hand lever is fastened to the driving disk for rotating the respective large wheel with less labor and for supporting the wheelchair on the ground permitting the wheelchair to be moved over an obstacle. According to still another aspect of the present invention, an adjustable foot plate stand with rollers is fastened to either hanger bracket of the wheelchair below the respective foot plate for supporting the wheelchair in moving over an obstacle.

DETAILED DESCRIPTION OF THE PREFERRED EMBODIMENT

Figure 1:
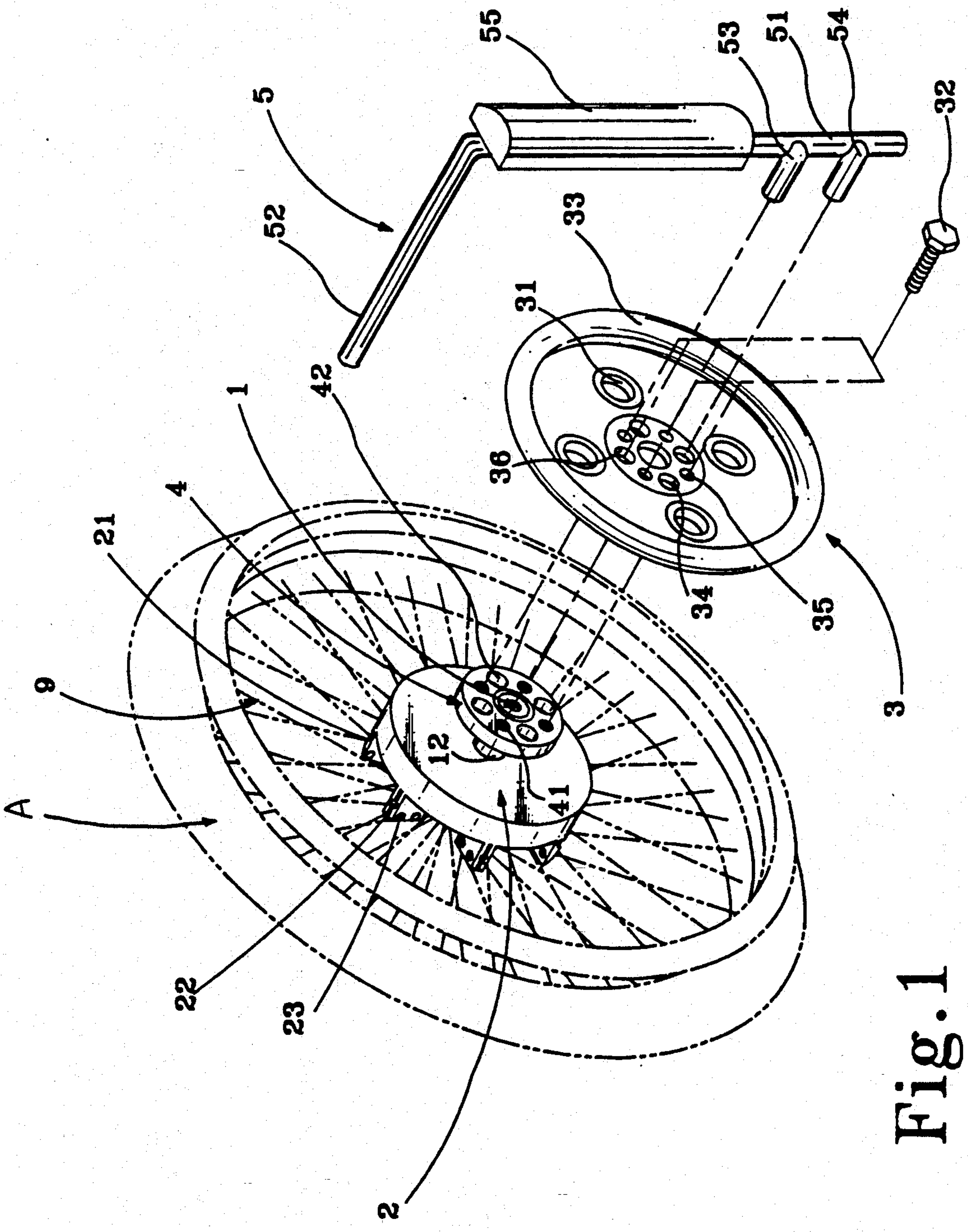
FIG. 1 is an exploded view of a wheelchair driving mechanism according to the present invention.

Referring to the annexed drawings in detail a wheelchair driving mechanism as constructed in accordance with the present invention is generally comprised of a ratchet wheel mechanism 1, a circular casing 2, a driving disk 3, a circular table 4, a hand lever 5, and an adjustable foot plate stand 6. Of course, two wheelchair driving mechanisms should be used and respectively attached to the two large wheels of a wheelchair for steering control.

Figure 2:
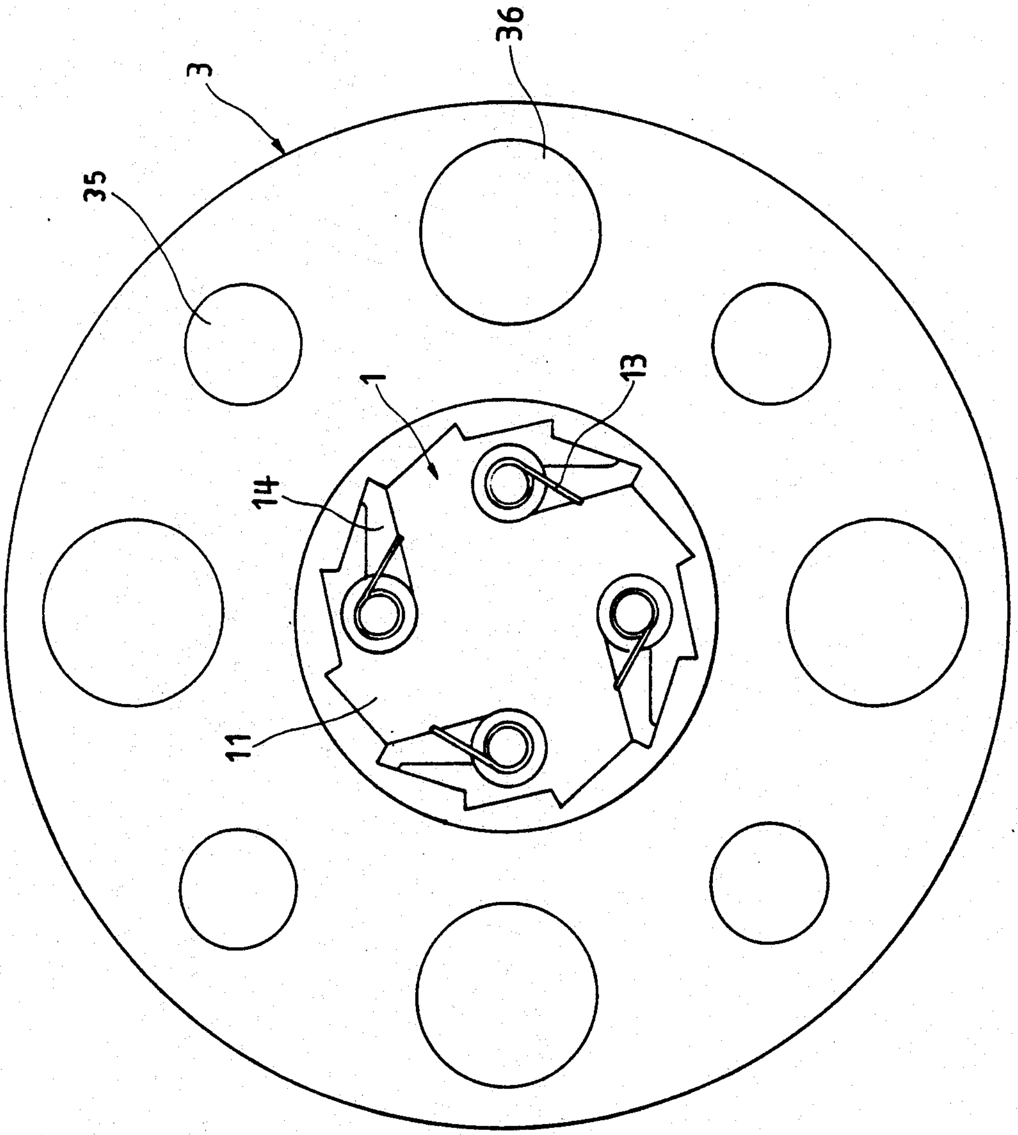
FIG. 2 shows the structure of the ratchet wheel mechanism in an enlarged scale.
Figure 3:
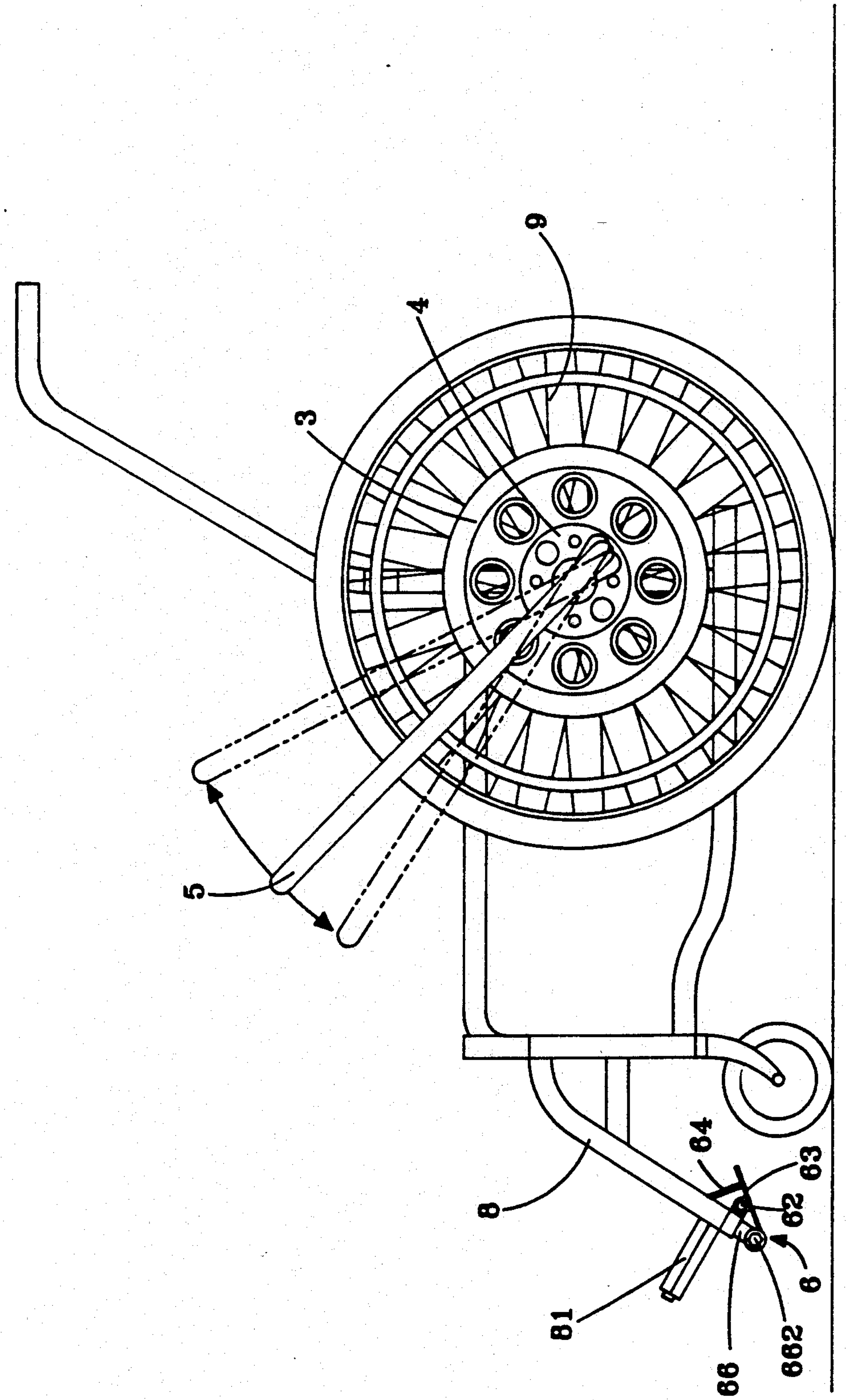
FIG. 3 shows the wheelchair rotated to move by a hand lever according to the present invention.
Figure 4:
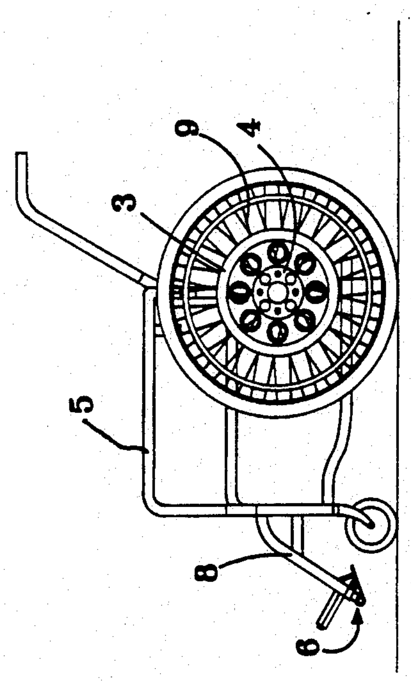
FIG. 4 shows the wheelchair moved on a flat ground.
Figure 5:
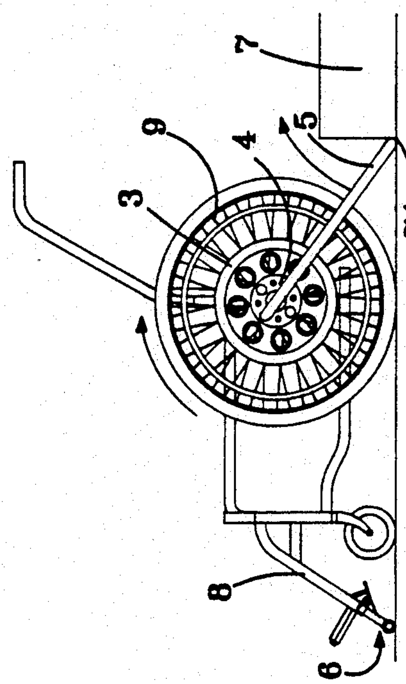
FIG. 5 shows the wheelchair moved to the step with the hand lever stopped against the riser of the step.
Figure 6:
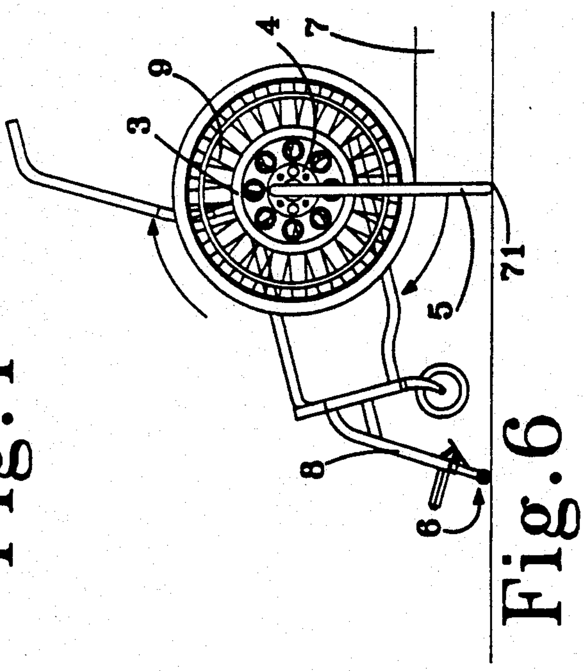
FIG. 6 shows the position of the wheelchair supported on the hand lever and moved to the top edge of the step.
Figure 7:
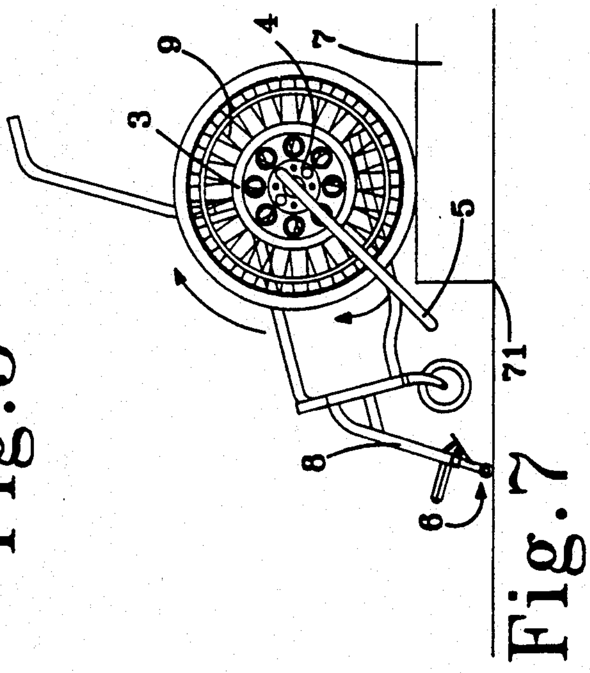
FIG. 7 shows the wheelchair moved over the step.

Referring to FIGS. 1, 2 and 3, the driving disk 3 comprises a rim 33, a plurality of circular recesses 31 equiangularly spaced from one another within the rim 33, a plurality of bolt holes 35 and through holes 36 alternatively formed on a center bearing 34 thereof around a circle and respectively and equidistantly spaced from one another. The ratchet wheel mechanism 1 is fixedly fastened in a center hole (not shown) on the circular table 4. The circular table 4 has a plurality of bolt holes 41 and through holes 42 at locations corresponding to the bolt holes 35 and through holes 36 on the driving disk 3. By threading screw bolts 32 through the bolt holes 35 on the driving disk 3 into the bolt holes 41 on the circular table 4, the circular table 4 is fastened to the driving disk 3 at one side. As the circular table 4 has been connected to the driving disk 3, the through holes 42,36 are respectively aligned. The ratchet wheel mechanism 1 is comprised of a hollow shaft 12 extended out of the circular table 4 and inserted into a hole (not shown) on the circular casing 2 and locked in place by a lock device (not shown). Therefore, the driving disk 3 and the circular table 4 become fastened to the circular casing 2 by the ratchet wheel mechanism 1. The circular casing 2 has a plurality of radial chucks 21 on a back side thereof, of which each has a spoke slot 22, which receives a respective spoke 9 of the adjacent large wheel A, and a plurality of bolt holes 23 through the spoke slot 22. As the radial chucks 21 have been respectively mounted on respective spokes 9 of the adjacent large wheel A, screw bolts (not shown) are respectively threaded into the bolt holes 23 on each radial chuck 21 to lock the circular casing 2 to the spokes 9 of the adjacent large wheel A. The hand lever 5 is made from an angle bar comprised of a transverse rod 52 and vertical rod 51. The vertical rod 51 of the hand lever 5 comprises a hand pad 55 adjacent to a top end thereof connected to the transverse rod 52, and two perpendicular plug rods 53, 54 spaced adjacent to a bottom end thereof. By inserting the perpendicular plug rods 53,54 through two opposed through holes 36 on the driving disk 3 into two corresponding through holes 42 on the circular table 4, the hand lever 5 is connected to the driving disk 3 and the circular table 4. As illustrated in FIG. 2, the ratchet wheel mechanism 1 is comprised of a plurality of catches 14 retained inside a toothed hole 11 by respective springs 13. Rotating the ratchet wheel mechanism 1 clockwise causes it to run idle. Rotating the ratchet wheel mechanism 1 counter-clockwise causes it rotate the driving disk 3. When two wheelchair driving mechanisms of the present invention have been fastened to the two large wheels of a wheelchair, the ratchet wheel mechanism of one wheelchair driving mechanism should be fastened in reverse direction against the ratchet wheel mechanism of the other wheelchair driving mechanism, and therefore the wheelchair can be rotated on its own axis. The ratchet wheel mechanism 1 is of the known art and not within the scope of the present invention, therefore no further description is given. By means of the operation of the ratchet wheel mechanism 1, the user can move the wheelchair by continuously pushing the rim 33 of the driving disk 3 or inserting fingers into either circular recess 31 and rotating it, when the hand lever 5 is not used. For changing the steering direction, the driving wheel 3 of one wheelchair driving mechanism is held tightly in the hand and the driving wheel 3 of the other wheelchair driving mechanism is rotated. The hand lever 5 may be fastened to the driving disk 3 of the respective wheelchair driving mechanism for rotating the driving disk 3 in driving the wheelchair with less labor (see FIG. 3).

Referring to FIGS. 4, 5, 6 and 7, by stopping the transverse rod 52 of the hand lever 5 against the riser 71 of the step 7 then rotating the driving disk 3 to move the wheelchair, the wheelchair can be conveniently moved over the step 7 by the user.

Figure 8:
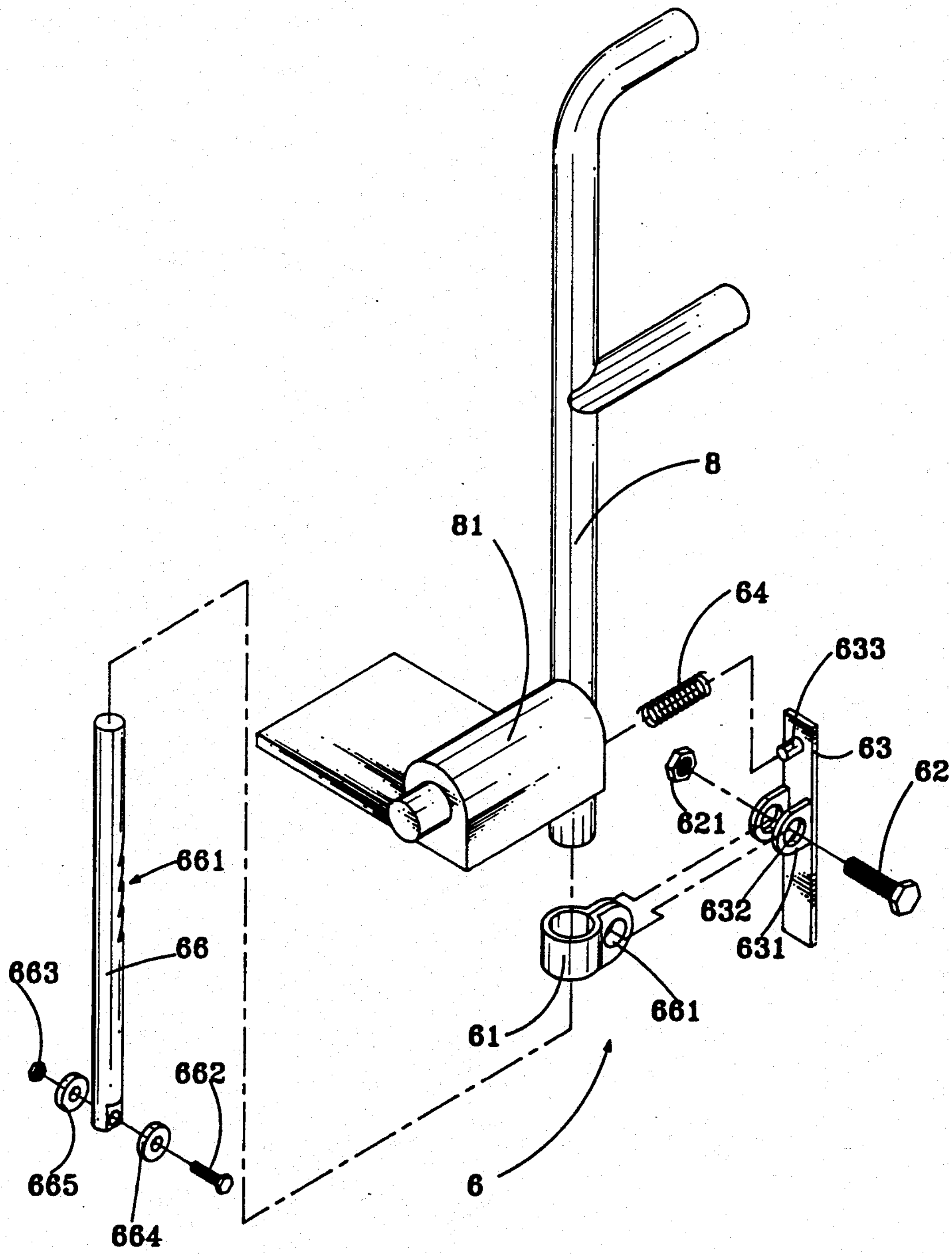
FIG. 8 is an exploded view of an adjustable foot plate stand according to the present invention.
Figure 9:
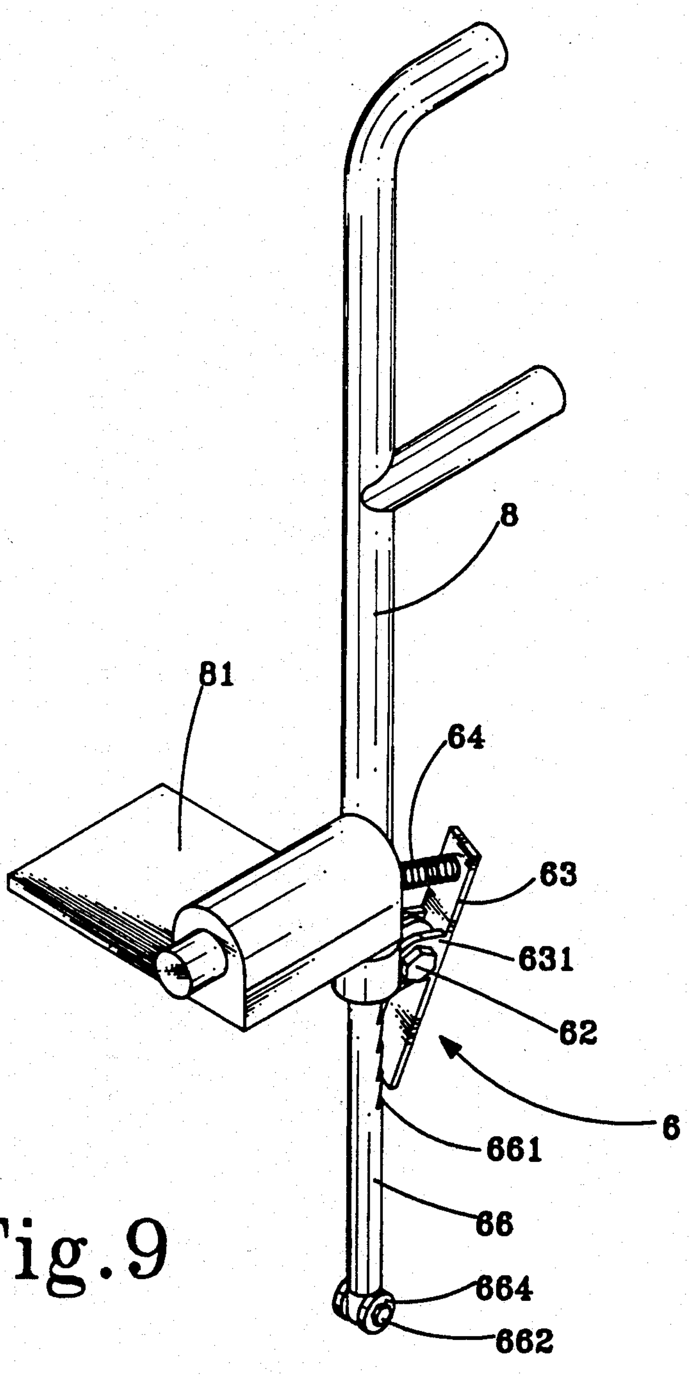
FIG. 9 is an assembly view of the adjustable foot plate stand fastened to the hanger bracket.

Referring to FIGS. 8 and 9, the adjustable foot plate stand 6 is comprised of a camp 61, a follower plate 63 and an extension leg 66. The clamp 61 is mounted on the respective hanger bracket 8 below the foot plate 81 with two opposite eye ends 661 attached together and fastened to two spaced lugs 631 on the follower plate 63. By inserting a bolt 62 through the hole 632 on each lug 631 and the eye ends 661 of the clamp 61 then screwed up with a locknut 621, the two opposite eye ends 661 of the clamp 61 is retained in between the two spaced lugs 631 of the follower plate 63, and therefore the follower plate 63 becomes pivoted to the clamp 61. The follower plate 63 has a perpendicular rod 633 adjacent to a top end thereof connected to the foot plate 81 by a compression spring 64. The extension leg 66 has a top end inserted into an axial hole (not shown) on the bottom edge of the hanger bracket 8 and a bottom end coupled with two opposite rollers 664,665 by a bolt 662 and a locknut 663. The extension leg 66 further comprises a plurality of notches 661 at different levels. By stopping the bottom edge of the follower plate 63 against either notch 661, the extension leg 66 is prohibited from being moved back into the hanger bracket 8. By means of removing the bottom edge of the follower plate 63 from the notch 661, the extension leg 66 can be adjusted to the desired height. Of course, stop means may be used to secure the top end of the extension rod 66 inside the hanger bracket 8, and therefore the extension leg 66 does not disconnect from the hanger bracket 8. As the extension leg 66 has been adjusted to a proper height, the rollers 664,665 are movably supported on the ground to help the user in moving the wheelchair over a step or an obstacle.

I claim:

1. A wheelchair driving mechanism comprising:

a circular casing having a plurality of radial chucks fastened to spokes on either large wheel of a wheelchair, said radial chucks each having a spoke slot, which receives a respective spoke, and bolt holes through the spoke slot, through which screw bolts are respectively inserted and locked with a respective locknut to fasten the respective chuck to the respective spoke;

a circular table having a ratchet wheel mechanism fastened to said circular casing for permitting the circular table to be driven to rotate said circular casing as the circular table is rotated in one direction and for permitting the circular table to run idle as the circular table is rotated in the reverse direction, a plurality of through holes and a plurality of bolt holes alternatively arranged around a circle and equiangularly spaced from one another;

a driving disk having a rim for pushing with a hand, a plurality of bolt holes and a plurality of through holes alternatively made around a center bearing thereof, and a plurality of circular recesses around said bearing within said rim, the bolt holes on said driving disk being respectively fastened to the bolt holes on said circular table by screw bolts and locknuts, the through holes on said driving disk being respectively aligned with the through holes on said circular table; and an adjustable foot plate stand fastened to either hanger bracket of said wheelchair below the respective foot plate, said adjustable foot plate stand comprising an extension leg inserted in an axle hole on the respective hanger bracket, a follower plate having a middle part pivoted to the respective hanger bracket by a clamp and a bolt and locknut set, and, a top end fastened to the respective foot plate by a compression spring, and a bottom end controlled to stop said extension leg in place.

2. The wheelchair driving mechanism of claim 1 wherein the radial chucks are spaced from one another according to the interval in the spokes of the respective large wheel of the wheelchair.

3. The wheelchair driving mechanism of claim 1 which further comprises a hand lever fastened to said driving disk for rotating the respective large wheel of the wheelchair through said driving disk, said circular table and said circular casing, said hand lever being made from an angle rod consisting of a transverse rod and a vertical rod, said vertical rod having a hand pad at a higher position and two spaced perpendicular plug rods at lower positions, each perpendicular plug rod being inserted in either through hole on said driving disk and the corresponding through hole on said circular table.

4. The wheelchair driving mechanism of claim 1 wherein said extension leg has a bottom end coupled with at least one roller.

* * * * *